(No Model.)
C. C. SPRINGER.
CLAMP OR FASTENING DEVICE FOR LINES.
No. 594,126. Patented Nov. 23, 1897.
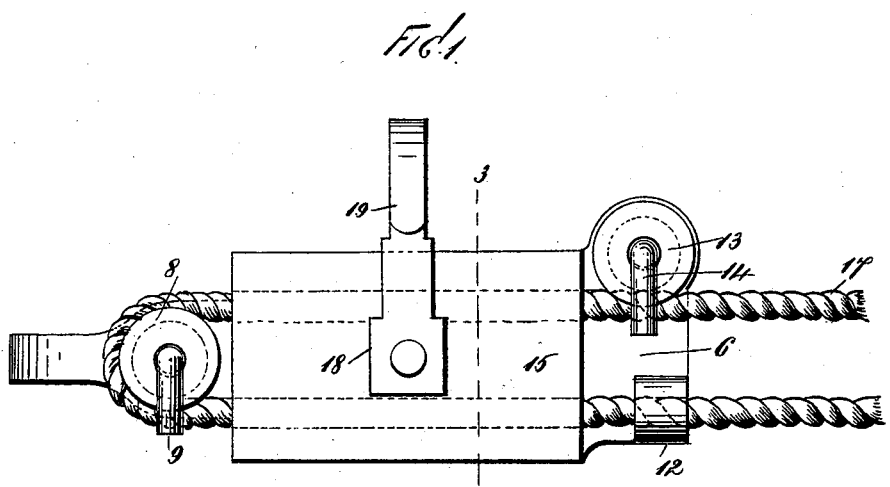
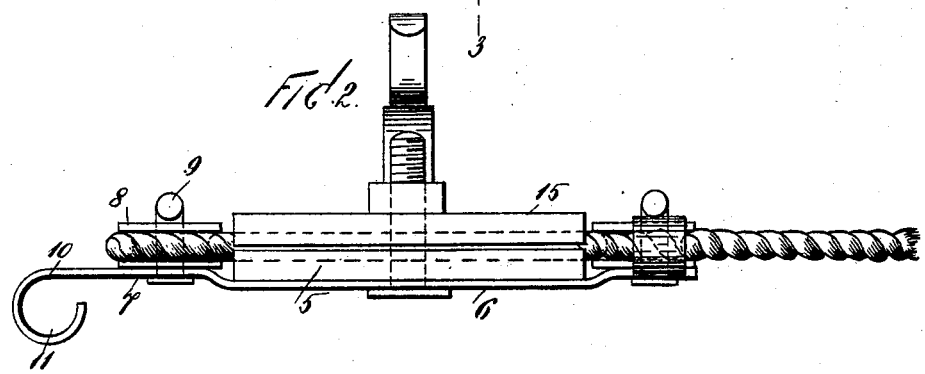
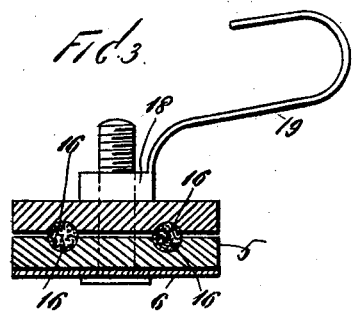
WITNESS
John Buckler,
C. Gersh.
INVENTOR
Christopher Charles Springer
BY
Edgar Tate & Co
ATTORNEYS.

UNITED STATES PATENT OFFICE.

CHRISTOPHER CHARLES SPRINGER, OF POUGHKEEPSIE, NEW YORK.

CLAMP OR FASTENING DEVICE FOR LINES.

SPECIFICATION forming part of Letters Patent No. 594,126, dated November 23, 1897.

Application filed April 2, 1897. Serial No. 630,386. (No model.)

*To all whom it may concern:*

Be it known that I, CHRISTOPHER CHARLES SPRINGER, a citizen of the United States, residing at Poughkeepsie, in the county of Dutchess and State of New York, have invented certain new and useful Improvements in Clamps or Fastening Devices for Lines, of which the following is a full and complete specification, such as will enable those skilled in the art to which it appertains to make and use the same.

This invention relates to clamps or fastening devices for clothes-lines and other ropes or cables; and the object thereof is to provide an improved device of this class which is particularly adapted for use in connection with endless clothes-lines or similar ropes or cables such as are passed around a pulley connected with a suitable base or support and passed through a clamping-block or other support which is adapted to be suspended from a hook secured to a wall or window-frame.

The invention is fully disclosed in the following specification, of which the accompanying drawings form a part, in which—

Figure 1 is a plan view of my improved clamp or fastening device, Fig. 2 a side view thereof, and Fig. 3 a section on the line 3 3 of Fig. 1.

In the drawings forming part of this specification the separate parts of my improvement are designated by the same numerals of reference in each of the views, and in the practice of my invention I provide an oblong block 5, in one side of which is secured a plate 6, which projects at each end of the block 5, and said plate is provided at one end with an extension 7, on which is mounted a pulley 8, the shaft of said pulley being turned at right angles, as shown at 9, so as to hold the pulley thereon, and the extension 7 of the plate 6 is projected to form an arm 10, which is formed into a ring, eye, or hook 11. The opposite end of the plate 6 is provided with a tubular keeper 12 at one side and with a pulley 13 at the opposite side, and the shaft of the pulley 13 is bent at right angles to form an arm 14, by which the pulley 13 is held on said shaft.

I also provide a clamping-block 15, which is of the same form and shape as the block 5 and which is secured thereto by a bolt 16, which is passed through the plate 7 and the block 5 and the clamping-block 15, and said clamping-block 15 and the plate or block 5 are provided in their adjacent surfaces with grooves 16, through which the separate sides of the line or cable are passed.

The bolt 16 is provided with a nut 18, on which is formed an arm 19, by which said nut is operated, and in practice the line is passed through the keeper 12, through one of the grooves 16, and then around the pulley 8, and back through the other groove 16, and over the pulley 13.

The hook or eye 11 is intended as means for suspending the clamp or fastening device from a hook or other support secured to a wall or other structure, and the operation will be readily understood from the foregoing description when taken in connection with the accompanying drawings and the following statement thereof.

By loosening the nut or bur 18 the line or cable 17 may be moved through the clamping-block, as will be readily understood, and by tightening said nut or bur the line or cable will be secured in any desired position, the block 15 serving to securely clamp and hold the same in contact with the plate or block 5.

This device is simple in construction and operation and is perfectly adapted to accomplish the result for which it is intended, while being also comparatively inexpensive.

Having fully described my invention, I claim as new and desire to secure by Letters Patent—

A clamp or fastening device for lines or cables, consisting of a plate or block 5, to one side of which is secured a metal plate which projects at each end thereof, said metal plate being provided at one end with a keeper which is secured to one side thereof, and at the opposite side with a pulley and said plate being provided at its opposite end with a pulley and with a hook or other attaching device, and a clamping-block which is connected with said plate or block by a bolt which is passed therethrough, and on which is mounted a nut or bur, said plate or block and said clamping-block being provided with two longitudinal grooves in their adjacent surfaces through which the line is passed, substantially as shown and described.

In testimony that I claim the foregoing as my invention I have signed my name, in presence of the subscribing witnesses, this 29th day of March, 1897.

CHRISTOPHER CHARLES SPRINGER.

Witnesses:
 WILLIAM L. KOPF,
 DWIGHT H. BUNNELL.